United States Patent [19]
Hydro

[11] 3,919,243
[45] Nov. 11, 1975

[54] SUBSTITUTED PIPERIDINIUM CHLORIDES

[75] Inventor: William R. Hydro, Bel Air, Md.

[73] Assignee: The United States of America as represented by the Secretary of the Army, Washington, D.C.

[22] Filed: Dec. 1, 1967

[21] Appl. No.: 687,392

[52] U.S. Cl. ....... 260/293.67; 260/293.68; 424/267
[51] Int. Cl.² ........................................ C07D 405/02
[58] Field of Search... 260/294.3 A, 293.67, 293.68; 424/267, 275, 285

[56] References Cited
UNITED STATES PATENTS
3,408,356  10/1968  Horovitz ........................ 260/294.3

Primary Examiner—Leland A. Sebastian
Attorney, Agent, or Firm—Nathan Edelberg; Robert P. Gibson; Kenneth P. Van Wyck

[57] ABSTRACT

Incapacitating agents wherein heterocyclic substituents are attached to the 1-position of the piperidine and methods of producing same comprising reacting a substituted acetyl, secondary amine and formaldehyde in an alcohol with subsequent treatment forming the iodide salt which is further reacted with 4-phenyl-4-piperidinol forming the corresponding N-substituted piperidinol. The latter piperidinol is treated with propionyl chloride and acid producing the salt of the N-substituted 3-oxo alkyl derivative of piperidium chloride.

The corresponding 3-hydroxy derivative of the said 3-oxo alkyl derivative is prepared by reacting the latter derivative with an alcoholic alkali metal borohydride.

12 Claims, No Drawings

SUBSTITUTED PIPERIDINIUM CHLORIDES

DEDICATORY CLAUSE

The invention described herein may be manufactured, used, and licensed by or for the Government for governmental purposes without the payment to me of any royalty thereon.

This invention relates to new N-substituted piperidine compounds and their method of preparation.

It is the object of the present invention to provide useful compositions of novel heterocyclic substituents attached to the 1 position of the piperidine ring.

It is a further object of the invention to provide compositions which have greater incapacitation levels than known compounds.

Piperidines are known as having a large number of aryl and lower acyloxy substituents attached to the 4-position carbon atom of the piperidine ring. Other groups substituted on piperidines are also known in which various radicals are attached to the nitrogen atom of piperidine ring such as lower alkyl and aralkyl.

Carabateas et al., J. Med. Pharm. Chem., Vol 5, p. 913 (1962) published 4-phenyl-4-propionoxy piperidines with various substituents attached to the 1-position. The substituents which were of particular interest were the (3-hydroxy-3-phenylpropyl) and (3-oxo-3-phenylpropyl) since their potency relative to meperidine were 3219 and 1346, respectively.

An investigation was instituted to prepare compounds with greater potency than have hitherto been prepared. The search for these compounds finally rested in the preparation of furan and thiophene derivatives of 4-phenyl-4-propionoxy piperidines having the following structure:

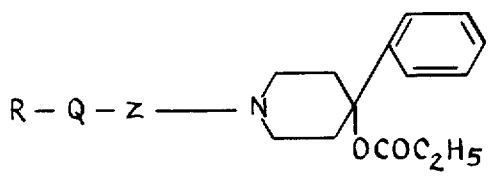

wherein R is

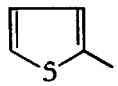

or

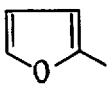

Q is 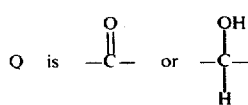

Z is lower alkylene of 1 to 4 carbon atoms
compound A where R is

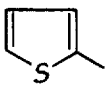

and Q is

compound B where R is

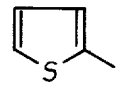

and Q is

compound C where R is

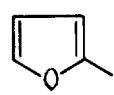

and Q is

compound D where R is

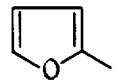

and Q is

I have discovered that when the reaction products resulting from reacting about 10–25g of a substituted acetyl, 6–15g of a secondary amine, and 2–9g of formaldehyde in an alkaline lower alkyl alcohol in the presence of methyl iodide forming the iodide salt which is reacted with 1–10g of 4-phenyl-4-piperidinol to form the N-substituted 4-phenyl-4-piperidinol. The latter piperidinol is treated with 0.2–2.0g propionyl chloride and anhydrous hydrochloric acid produced the N-substituted 3-oxo lower alkyl derivatives of the piperidium chloride compounds of the invention. The corresponding N-substituted 3-hydroxy lower alkyl derivative is prepared by treating 3-oxo derivative with about 0.16–0.20g of alkali metal borohydride and then anhydrous hydrogen chloride and lower alkyl acetate gave rise to the said N-substituted 3-hydroxy derivative.

The potency of these new compounds varies from about 0.2 to 8.0 times as effective as 1-[3-oxo-3-phenylpropyl]4-phenyl-4-acyloxy piperidine hydrochloride being the standard in Table 1.

Pharmacological evaluation of the N-substituted piperidines of this invention for potency was determined by the administering intravenously various proportions (mg/kg) of the compounds upon mice using the method of "The Search for and Selection of Toxic Chemical Agents for Weapons Systems" disclosed in the Edgewood Arsenal, Maryland Publication (CRDL SOP 70–3, May 6, 1965). $LD_{50}$ is the lowest dose in mg of compound per kilogram of animal required to be lethal in 50% of the tested animals. $MED_{50}$ is the lowest dose in mg of compound per kilogram of animal required to give any visible physiological effects (i.e., mydriasis) in 50% of the tested animals. The quotient of the ratio $LD_{50}/MED_{50}$ described in Table 1 below is the margin of safety that is the higher numerical quotient the greater the proportion of agent can be used before causing death and therefore a better incapacitating agent.

Table 1

| Compound | Potency ($LD_{50}/MED_{50}$) |
| --- | --- |
| Standard | 1 |
| A | 7.9 |
| B | 2.8 |
| C | 0.28 |
| D | 5.0 |

Standard = 1-(3-Oxy-3-phenylpropyl)-4-phenyl-4-propionoxypiperidinium Chloride.
A = 1-[3-Oxy-3-(2-thienyl)propyl]-4-phenyl-4-propionoxypiperidinium Chloride
B = 1-[3-Hydroxy-3-(2-thienyl)propyl]-4-phenyl-4-propionoxypiperidinium Chloride.
C = 1-[3-Oxy-3-(2-furyl)propyl]-4-phenyl-4-propionoxy piperidinium Chloride.
D = 1-[3-Hydroxy-3-(2-furyl)propyl]-4-phenyl-4-propionoxypiperidinium Chloride.

The marked increase in incapacitation displayed by the compounds of this invention is very clear. While compound C may appear less desirable in exhibiting an approximate lower margin of safety, the compound is unmistakably a more effective lethal agent.

The inventor also contemplates the use of 4phenyl-4-acyloxy piperidines, such as are disclosed and their method of preparation in the copending application, Ser. No. 648,546, filed June 21, 1967, to Hydro and Sundberg, assignors to the U.S. Government, to be condensed with 2-thienyl vinyl ketone as an alternate method to prepare the compounds of this invention.

As the lower alkyl alcohol there may be used methanol, ethanol, propanol, isopropanol or butanol.

The ether employed can be methyl, ethyl, propyl, or butyl.

The alkaline agent may be any alkali metal hydroxide such as sodium or potassium.

The molecular structures of the compounds of the invention are established by their synthesis and corroborated by the correspondence of factual material from the physical, calculated and found values for the elementary analyses and spectral analyses.

EXAMPLE 1 a. 2-(2-Thenoyl)ethyl dimethylamine Hydrochloride

An alcoholic solution is prepared by refluxing on a steam bath for about 4 hours of a mixture of about 20.0g of 2-acetylthiophene, 13.0g dimethylamine hydrochloride, 5.7g paraformaldehyde and 50.0 ml absolute alcohol and upon cooling a heavy white insoluble product is removed by filtration and dried in an oven at 50°C. for 2 hours. The dried product amounts to about 17.3g, m.p. 171°–173°C.

b. 2-(2-Thenoyl)ethyltrimethylammonium Iodide

A suspension comprising about 16.3g of 2-(2-thenoyl)-ethyldimethylamine hydrochloride [see (a) above] in 350 ml water cooled in an ice bath is made basic with 4–8 ml of 35% sodium hydroxide solution forming an immiscible oily phase. Ether extracts are prepared by treating the isolated oily phase 3 times with 100 ml portions of ether and the combined extracts are dried over anhydrous sodium sulfate, filtered and refluxed on a steam bath for about one-half hour to remove any dimethylamine, and subsequent addition in a dropwise manner over a ½-hour duration of an ether solution comprising of about 10.6g methyliodide in 50 ml of sodium-dried ether forms a white precipitate. The mixture is continued to be refluxed for an additional 1 to 2 hours after the ether-iodide addition, cooled overnight, and the white precipitate separated by filtration is washed with sodium-dried ether and dried in a vacuum oven at 50°C., a yield of about 17.3g, m.p. 202°–205°C. decomposition.

c. 1-[2-(2-Thenoyl)ethyl]-4-phenyl-4-piperidinol water

A mixture comprising about 16.0g of 2-(2-Thenoyl)ethyltrimethylammonium Iodide, see (b) above, 8.7g. of 4-phenyl-4-piperidinol, 10.4g of sodium carbonate, and 150 ml of dimethyl formamide is stirred at ambient temperature with nitrogen bubbling through mixture for about 5 hours to expel the formed trimethylamine, and pouring the stirred mixture into a liter of wataer forming an insoluble product and cooling the reacting mixture overnight. The insoluble product is removed, copiously washed with distilled water and dried overnight at about 80°C. The yield is about 13.5g, m.p. 146°–148°C., recrystallization from benzene gave a m.p. 148°–150°C.

Anal. Calc. $C_{18}H_{21}NO_2S$: C, 68,54; H, 6.71; S, 10.17. Found: C, 68.58; H, 6.45; S, 10.2.

d. 1-[3-Oxo-3-(2-thienyl)propyl]-4-phenyl-4-propionoxypiperidinium Chloride

At ambient temperatures, a chloroform solution comprising about 1.8g propionyl chloride in 20 ml chloroform is added rapidly dropwise to a stirring mixture comprising about 13.5g sodium carbonate, 2.3g water, 180ml chloroform and 5.0g 1-[2-(2-Thenoyl)-ethyl]-4-phenyl-4-piperidinol, see (c) above, with continued agitation for about 4–5 hours. The chloroform mixture reaction product is filtered and the volatiles are removed in vacuo in a rotary evaporator utilizing a minimum of heat to form a syrupy product which is dissolved in ether, dried over anhydrous magnesium sulfate for about 1 hour and filtered. The ether solution is cooled from about −5° to +8°C. and with stirring anhydrous hydrogen chloride is added until complete precipitation of the salt is obtained, whereupon the mixture is evaporated in vacuo in a rotary evaporator. The residue is triturated with ethyl acetate and cooled rapidly with the product isolated by filtration. The product is crystallized from acetone or acetone-ether to give a yield of about 4.5g, m.p. 169°–171°C. The proposed structure was confirmed by infrared spectrum.

Anal. Calc. $C_{21}H_{26}Cl\ NO_3S$: C, 61.83; H, 6.42; S, 7.86. Found: C, 61.48; H, 6.96; S, 7.97.

e. 1-[3-Hydroxy-3-(2-thienyl)propyl]-4-phenyl-4-propionoxypiperidinium Chloride A methanolic alkaline solution comprises a sodium hydroxide pellet in 60 ml of methanol.

An approximate neutral alcoholic solution (pH 6.5–7.5) at about 0°C. comprises about 1.5g of 1-[3-Oxo-3-(2-thienyl)propyl]-4-phenyl-4-propionoxypiperidinium chloride, see (d) above, in 50 ml at 0°C. of above prepared methanolic solution.

Sodium borohydride about (0.18g) is dissolved in the remaining 10 ml of the above prepared methanolic solution, filtered and added to the said alcoholic solution (pH 6.5–7.5) over 8 to 10 minutes at about 0°C. and maintained at this temperature for an additional 6 hours. The reacted alcoholic mixture (clear, colorless solution, pH 8.5–9.5) is treated with anhydrous hydrochloric acid (about pH 2.0) with subsequent removal of volatiles in vacuo. The residue extracted with ethyl acetate, filtered and evaporated in vacuo yielded a white "frothy" solid product. The product is highly soluble in ethyl acetate or acetone and is recrystallized from acetone-ether giving about 1.31g, m.p. 72°–92°C. The infrared spectrum confirmed the proposed structure.

Anal. Calc. $C_{21}H_{28}Cl\ NO_3S$: C, 61.52; H, 6.88; S, 7.82. Found: C, 61.25; H, 7.25; S, 7.80.

EXAMPLE 2 a. 2-(2-Furoyl)ethyldimethylamine Hydrochloride

An alcoholic solution is prepared by refluxing on a steam bath for about 2 to 3 hours a mixture comprising 12.0g of 2-acetylfuran, 3.9g paraformaldehyde, 8.9g dimethylamine hydrochloride, 50.0 ml absolute alcohol, and concentrated hydrochloric acid (about 4drops) with succeeding cooling to room temperature. Upon standing at an ambient temperature a yellow colored precipitate is formed which is separated by filtration and dried in a vacuum oven at 50°C. A yield of 9.5g. is obtained, m.p. 174°–176°C.

b. 2-(2-Furoyl)ethyltrimethylammonium Iodide

An alkaline solution comprising about 7.0g of 2-(2-Furoyl) ethyldimethylamine hydrochloride, see (a) above, in 250 ml of water is cooled in an ice bath and made basic with about 3 ml of 35% solution of sodium hydroxide forming an immiscible oily phase which separates out of solution. Ether extracts are prepared by treating the isolated oily phase two times with 100 ml portions and the combined extracts are dried over anhydrous sodium sulfate, filtered and refluxed on a steam bath for about one-half hour to remove any dimethylamine. After the subsequent addition in a dropwise manner over about a ½-hour duration of an ether solution comprising about 4.8g of methyl iodide in 50 ml of sodium-dried ether resulting in a solution which is continued to reflux for an additional 1 hour during which time the solution becomes cloudy, cooled overnight, an insoluble product is formed, separated by filtration, washed with sodium-dried ether, and dried in a vacuum oven at 50°C. A yield of 4.2g, m.p. 192°–194°C. decomposition.

c. 1-[2-(2-Furoyl)ethyl]-4-phenyl-4-piperidinol

A mixture comprising about 3.9g of 2-(2-Furoyl)ethyltrimethylammonium iodide, see (b) above, 2.2g of 4-phenyl-4-piperidinol, 2.7g sodium carbonate, and 100 ml of dimethylformamide is stirred at room temperature with nitrogen bubbling through mixture for about 4–6 hours in order to expel the formed trimethylamine. Pouring the mixture into a liter of water formed no visible precipitate, however, upon standing overnight, a yellow product is formed, separated by filtration, copiously washed with distilled water and dried overnight in vacuum oven at 60°C. The yield is about 2.1g, m.p. 150°–153°C., recrystallization from benzene gave a m.p. 151°–153°. Infrared Spectrum confirmed the proposed structure.

Anal. Calc. $C_{18}H_{21}NO_3$: C, 72.2; H, 7.07. Found: C, 71.6; H, 6.9.

d. 1-[2-(2-Furoyl)ethyl]-4-phenyl-4-propionoxypiperidinium Chloride

At ambient temperature, a chloroform solution comprising about 0.4g of propionyl chloride in 15 ml of chloroform is added rapidly dropwise to a stirring mixture comprising about 2.8g of sodium carbonate, 0.5g water, 35 ml of chloroform and 1.0g of 1-[(2-Furoyl)ethyl]-4-phenyl-4-piperidinol (see (c) above) with continued agitation for about 4 to 6 hours. The chloroform mixture reaction product is filtered and volatiles are removed in vacuo in a rotary evaporator forming an oily residue which is dissolved in ether, dried over anhydrous magnesium sulfate and filtered. The ether filtrate is cooled to about 0°C. and with agitation is treated with anhydrous hydrogen chloride until complete precipitation of the hydrochloride salt whereupon the mixture is evaporated almost to dryness in vacuo in a rotary evaporator. The residue is triturated with ethyl acetate, cooled and the product is separated by filtration. Concentration of the ethyl acetate filtrate produces a second crop of crystals. The product is crystallized from acetone to give a yield of about 1.2g of the ester hydrochloride, m.p. 170°–172°. The proposed structure was confirmed by infrared spectrum.

Anal. Calc. $C_{21}H_{26}ClNO_4$: C, 64.34; H, 6.69; O, 16.33. Found: C, 63.5; H, 6.7; O, 16.4.

e. 1-[3-Hydroxy-3-(2-furyl)propyl]-4-phenyl-4-propionoxypiperidium chloride A methanolic alkaline solution — about $pH_{14}$ — comprises a sodium hydroxide pellet in 60 ml of methanol.

An approximately neutral alcoholic solution (pH 6.5–7.5) comprising about 1.44g of 1-2[2-(Furoyl)ethyl]-4-phenyl-4-propionoxypiperidinium chloride (see (d) above) in 50 ml at about −6°C. of the above prepared methanolic solution (pH 14).

Sodium borohydride 0.18g is dissolved in the remaining 10 ml of the above prepared methanolic solution, filtered and added to the above prepared said alcoholic solution (pH 6.5–7.5)over 4–6 minutes maintaining the temperature at about −10° to −20°C. for about 4 to 7 hours with a subsequent temperature rise to about −4° to −6°C. The solution at the latter temperature is treated with anhydrous hydrochloric acid with subsequent removal of volatiles in vacuo forming a solid residue which was extracted with ethyl acetate forming a slurry, filtered and recovering a white residue. This latter residue is extracted with acetone and upon removal of acetone gives about 1.2g of colored solid, m.p. 143°C. The colored solid is decolorized by redissolving in acetone and addition of activated carbon with removal of the acetone forming a white product. The product is recrystallized from acetone-ether gave about 0.84g of white crystals, m.p. 154°–155.5°C. Infrared analysis confirmed the proposed structure.

Anal. Calc. $C_{21}H_{28}Cl NO_4$: C, 64.03; H, 7.16; O, 16.25.
Found: C, 63.8; H, 7.4; O, 16.6.

EXAMPLE 3

4-Phenyl-4-propionoxy piperidium chloride (see copending application Ser. No. 648,546 for preparation) and 2-thienyl vinyl ketone are dissolved in chloroform at room temperature resulting in the formation of 1-[3-oxo-3-(2-thienyl)propyl]-4-phenyl-4-propionoxypiperidium chloride.

The forms of the invention as herein given may be considered as being by way of illustration. Numerous modifications may be made therein without departure from the spirit of the invention or the scope of the appended claims.

I claim:

1. In a method for producing substituted piperidines 1-[3-Oxo-3-(2-thienyl)propyl]-4-phenyl-4-propionoxypiperidinium chloride or 1-[3-Oxo-3-(2-furyl)-propyl]-4-phenyl-4-propionoxypiperidium chloride comprising the steps of:
    a. contacting 2-acetyl thiophene or 2-acetyl furan with dimethylamine and formaldehyde
    d. contacting the product resulting from (a) above with an excess of methyl iodide
    c. contacting the resulting product from (b) above with 4-phenyl-4-piperidium chloride
    d. contacting the product resulting from (c) above with propionyl chloride followed anhydrous hydrochloric acid and recovering 1-[3-Oxo-3-(2-thienyl)propyl]-4-phenyl-4-propionoxypiperidium chloride or 1-[3-Oxo-3-(2-furyl)propyl]-4-phenyl-4-propionoxypiperidium chloride.

2. In the method according to claim 1, wherein the compound 1-[3-Oxo-3-(2-thienyl)propyl]-4-phenyl-4-propionoxypiperidium chloride or 1-[3-Oxo-3-(2-furyl)propyl]-4-phenyl-4-propionoxypiperidium chloride resulting from (d) is further reacted with an alkaline lower alkyl alcohol solution and alkali metal borohydride with subsequent separation of final product 1-[3-Hydroxy-3-(2-thienyl)propyl]-4-phenyl-4-propionoxypiperidium chloride or 1-[3-Hydroxy-3-(2-furyl)propyl]-4-phenyl-4-propionoxypiperidium chloride.

3. In the method according to claim 1 wherein the acetyl compound in (a) is 2-acetyl thiophene and the product in (d) is 1-[3-Oxo-3-(2-thienyl)propyl]-4-phenyl-4-propionoxypiperidium chloride.

4. In the method according to claim 1 wherein the acetyl compound in (a) is 2-acetyl furan and the product in (d) is 1-[3-oxo-3-(2-furyl)propyl]-4-phenyl-4-propionoxypiperidium chloride.

5. In the method according to claim 2 wherein said compound is 1-[3-Oxo-3-(2-thienyl)propyl]-4-phenyl-4-propionoxypiperidium chloride and said product is 1-[3-Hydroxy-3-(2-thienyl)propyl]-4-phenyl-4-propionoxypiperidium chloride.

6. In the method according to claim 2 wherein said compound is 1-[3-Oxo-3-(2-furyl)propyl]-4-phenyl-4-propionoxypiperidium chloride and said product is 1-[3-Hydroxy-3-(2-furyl)propyl]-4-phenyl-4-propionoxypiperidium chloride.

7. A method of preparing 1-[3-Oxo-3-(2-thienyl)-propyl]-4-phenyl-4-propionoxypiperidium chloride the steps comprising reacting 4-phenyl-4-propionoxypiperidium chloride and 2-thienyl vinyl ketone in chloroform producing 1-[3-Oxo-3-(2-thienyl)eropyl]-4-phenyl-4-propionoxypiperidium chloride.

8. The compound

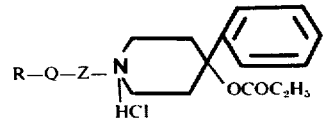

wherein
R is 2-thienyl or 2-furyl,
Q is carbonyl or

and
Z is lower alkylene.

9. The compound 1-[3-Hydroxy-3-(2-thienyl)-propyl]-4-phenyl-4-propionoxypiperidium Chloride.

10. The compound 1-[3-Oxo-3-(2-thienyl)propyl]-4-phenyl-4propionoxypipe ridium Chloride.

11. The compound 1-[3-Hydroxy-3-(2-furyl)propyl]-4-phenyl-4-propionoxypiperidium chloride.

12. The compound 1-[3-Oxo-3-(2-furyl)propyl]-4-phenyl-4-propionoxypiperidium chloride.

* * * * *